US012800379B2

(12) United States Patent
Horan

(10) Patent No.: US 12,800,379 B2
(45) Date of Patent: Nov. 17, 2026

(54) SYSTEM AND METHOD FOR DETERMINING A VOLUME OF A LIQUID

(71) Applicant: Pauline Horan, Port Macquarie (AU)

(72) Inventor: Pauline Horan, Port Macquarie (AU)

( * ) Notice: Subject to any disclaimer, the term of this patent is extended or adjusted under 35 U.S.C. 154(b) by 129 days.

(21) Appl. No.: 18/258,354

(22) PCT Filed: Dec. 23, 2021

(86) PCT No.: PCT/EP2021/087627
§ 371 (c)(1),
(2) Date: Jun. 20, 2023

(87) PCT Pub. No.: WO2022/136697
PCT Pub. Date: Jun. 30, 2022

(65) Prior Publication Data

US 2024/0302199 A1 Sep. 12, 2024

(51) Int. Cl.
*G01F 23/2962* (2022.01)

(52) U.S. Cl.
CPC ................................ *G01F 23/2962* (2013.01)

(58) Field of Classification Search
CPC ........ G01F 22/00; G01F 17/00; G01F 23/296; G01F 23/2969
USPC ........................................................... 367/99
See application file for complete search history.

(56) References Cited

U.S. PATENT DOCUMENTS 5,148,700 A * 9/1992 King .................... G01N 29/024 73/61.41
10,863,852 B1 * 12/2020 Lyons .................... B65D 23/14
2003/0088327 A1 * 5/2003 Taori ..................... G10L 19/018 704/E19.009
2009/0217749 A1 * 9/2009 Torigoe ................... G01F 17/00 73/149
2016/0025545 A1 * 1/2016 Saltzgiver ............ B65D 51/245 73/304 C
2017/0141453 A1 * 5/2017 Waelde ................... G01S 13/88
2018/0328776 A1 11/2018 Gurumohan

FOREIGN PATENT DOCUMENTS

DE 102019115337 A1 * 12/2020 .......... A47J 31/4482
EP 0770859 A1 5/1997
WO WO-2011134814 A2 * 11/2011 .......... A47J 31/4457

OTHER PUBLICATIONS

Esfahlani et al. ("Acoustic dispersive prism." Scientific reports 6.1 (2016): 18911) (Year: 2016).*
DE-102019115337-A1 (machine translation) (Year: 2020).*
Nierhaus, Thomas; Written Opinion of the International Searching Authority re: PCT/EP2021/087627; Jun. 30, 2022; 6 pages; European Patent Office, Munich Germany.
Esfahlani Hussein et al: "Acoustic dispersive prism", Scinetific Reports, [Online] vol. 6, No. 1; Jan. 7, 2016, XP055911631, DOI: 10.1038/srep18911 Retrieved from the Internet on Jun. 20, 2023: http://www.nature.com/articles/srep18911.
Machine Translation: EP0770859A1—Abstract; 2 pages.

* cited by examiner

*Primary Examiner* — Yuqing Xiao
*Assistant Examiner* — Christopher Richard Walker
(74) *Attorney, Agent, or Firm* — Rogue.law; Laura Schneider

(57) ABSTRACT

The present disclosure is directed towards a system and method for determining a change of volume within a container based on the surface area of material in the container.

17 Claims, 7 Drawing Sheets

SYSTEM AND METHOD FOR DETERMINING A VOLUME OF A LIQUID

TECHNICAL FIELD

The present disclosure is directed towards a system and method for determining a volume of matter in a container. The present disclosure is also directed towards a system for determining the amount of an additive to add to a volume of matter. In particular, the present disclosure is directed towards an automated method and system configured to determine the volume of matter in a container, calculate an amount of additive to add to the volume of matter based on the determined volume of the matter, and add the calculated amount of additive to the matter in the container.

BACKGROUND

In a large number of diverse industries (for example: food and beverage, petrochemicals (e.g. oil and gas), water management, waste water management, mining, metal processing, and steam and industrial water management), the ability to monitor liquid levels in tanks and containers of various shapes and sizes is essential to the safe, effective management of liquids. In addition to monitoring these tanks and containers, some industries require accurate dosing of an additive to a liquid. For example, in the wine industry, several additives (such as yeast, finings, antioxidants, etc.) are added to the wine at different stages of production. Dosing an additive more accurately to a volume ratio would help automate the process and reduce the risks of product loss due to human error.

Fuel additives increase the efficiency of existing fuel and assist in keeping a container (such as a tank) clean. By adding a small amount of additive, a large amount of fuel (e.g. petrol/diesel) can be saved. Users of a fuel additive (e.g. such as farmers, marine workers, truck drivers, etc.) need to calculate the amount of additive required. Due to the tedious nature of this process, the additive is often added incorrectly or not at all. As used herein the term ‘container’ refers to any receptacle suitable for storing a liquid. Thus, the term ‘container’ includes canisters, cartons, crates, pails, pouches, tanks, or any other type of vessel suitable for storing a fluid.

Many devices exist that monitor liquid level within a container. Most known devices can calculate a volume of liquid for a known container. These known devices are limited and can produce inaccurate readings. However, at present cost-effective system for monitoring the volume of liquid in a container of unknown dimensions does not exist. If one needs to monitor the volume of a liquid in a container of unknown dimensions, a strapping table, filling table or calibration chart must be provided in order to obtain accurate volume reading for the container. If there is no strapping table, the container is emptied, and a three-dimensional laser scanner is put into the empty container to scan the shape of the container. This scan can then be used to produce a strapping table. However, this is a costly process—as well as being disruptive to processing because of the need to empty the container (for example a crude oil storage container can hold sixteen million gallons of crude oil at a time).

Typically, the amount of additive added to a liquid is calculated based on a volume ratio—i.e. for a volume ration of x:y, x litres of additive is added to y litres of liquid. As used herein, adding the correct ratio of an additive to a volume of liquid is referred to as dosing the liquid with the additive. In order to correctly dose a liquid in a container with an additive, it is necessary to know the amount of liquid in the container. There are a number of known techniques for doing this. For example, flow rate in and out of a container can be used. However, unless the flow meters are well maintained, the accuracy of the reading is likely to drift as the system falls out of calibration over time e.g., where the incoming flow meter starts over reporting and the outgoing flow meter starts under reporting or vice versa.

Other dosing solutions measure chemical concentration of an additive in a liquid and dose according to measured chemical concentration of the additive. This is being done e.g. in swimming pools and water treatment facilities, where chlorine is dosed into the water. However, this approach is only viable if the additive can be chemically analysed.

In another approach a depth gauge is used. For example, US2019/011304 discloses an ultrasonic system that comprises a plurality of acoustic devices controllably deployed in respective positions on the outside surface of a cylindrical container, wherein the axis of the cylindrical container is vertical in use. US2015/000396 discloses a fill level sensor for measuring the fill level of liquid in the container. U.S. Pat. No. 5,303,585 discloses an ultrasonic sensor provided in a liquid, configured to determine the distance from the sensor to a liquid gas boundary at the surface of the liquid using the propagation time of a reflected wave. However, these methods only determine a liquid level and depend on the container having a known geometry or predetermined configuration to calculate total volume.

Simple stationary containers, such as those typically found on a farm, are seldom provided with a gauge. As such, the user is forced to administer the additive according to a volume ratio. The amount of additive required changes depending on the volume of liquid (e.g. fuel) added to the container. Therefore, the user needs to calculate the volume of additive to add to the liquid in the container each time liquid is added. Thus, some users (e.g. farmers) are unwilling to do so unless the additive can be accurately added automatically.

In other industries, where large containers contain level measurement sensors, the containers are usually of known dimensions. In most cases, these containers have a uniform internal horizontal cross-section along their vertical axis. However, this is not always the case. The size of containers can also vary (e.g. due to internal re-enforcements etc.)—resulting in different surface areas in different tanks.

In addition, most level gauges provided to the fuel tank of a motorised vehicle (such as e.g. a truck) typically use a float to determine a level e.g. in combination with a potentiometer. These are designed to provide a rough estimate of how close the container is to running out of fuel. This is useful to a driver of the vehicle to plan when to refuel but is not sufficiently accurate to determine the dosage of additive that needs to be added to the container after fuel has been added. Further, the circuit used for this level gauge is typically difficult to access and most drivers (e.g. such as truck drivers) do not want to access and retrofit equipment to this gauge or have the added concern of having to manually add an additive to the fuel supply.

NZ562038 discloses a fuel conditioner applicator system for dosing a liquid based on the reading of a gauge. However, the system requires a user to know and input the capacity of a fuel container into the system.

This approach is problematic because when retrofitting an automatic measurement and dosing system to an existing container which can have already been in service for a number years, a user may not know the capacity accurately. Furthermore, NZ562038 teaches that only the volume needs to be known and assumes that the level is linearly related to volume. This is not always the case e.g. when the container is a horizontal cylinder.

There is therefore a need for an automatic volume measurement system which solves these and other problems.

Separately, in the field of acoustics, acoustic dispersive prisms are being developed which may be useful are capable of splitting a sound wave into different, frequency-dependent, directions for direction finding (see the paper entitled "Exploiting the leaky-wave properties of transmission-line metamaterials for single-microphone direction finding" by Hussein Esfahlani et al, the paper entitled "Acoustic Leaky Wave Antennas: Direction-Finding via Dispersion" by Christina Naify et al, and the paper entitled "Acoustic dispersive prism" by Hussein Esfahlani et al).

Separately, in the field of optics, a LiDAR system that uses an optical prism is described in the paper entitled "Next Generation LIDAR for a fully autonomous future" by Cibby Pullkkaseril et al.

SUMMARY

The present disclosure is directed towards a system for determining a change in volume of matter within a container, the system comprising: a sensor; and a processor configured to: determine the surface area of matter in the container; and determine the change in volume of matter in the container based on the surface area and a distance measured by the sensor.

The surface area of matter in the container will extend to the perimeter of the container. As a result, cross section of any arbitrarily shaped container can be derived from the surface area. Thus, calculating a change in volume based on the surface area means that the change of volume can be calculated for any arbitrary container shape. As a result, the system can be easily moved from one container to another, regardless of shape, depending on usage demand. The matter can be a liquid, or a bulk, particulate, or powdered solid. Bulk solids are loose, dry commodities—for example sugar, starch, minerals, chemicals, pigments, fillers, plastic resin and recycled plastics. The container can be any container suitable for holding the matter.

The system can calculate the overall volume of matter within a known container at start-up. Over time, calculate the overall volume of matter within an arbitrary container by storing the calculated surface areas for different level measurements made.

Preferably, the processor is configured to determine an amount of additive to add to a container based on the determined change in volume of matter in the container.

As a result, the system can dose matter with an additive automatically while the volume in the container is changing, with very little time delay. This means that the additive gets mixed into the matter within the container as the container is filled, rather than calculating the overall change in volume at the end and adding the appropriate dose, which in turn simplifies mixing. In some applications, the additive is dosed when the change in volume is negative (i.e when the container is emptying). In some applications, a change in volume of material within a first container is determined and the additive is dosed into a second container based on the determined change in volume.

Preferably, the sensor comprises a transmitter for emitting a signal and a receiver for receiving a reflection of the signal, wherein the processor is configured to provide a signal indicative of distance based on the time difference between the signal being transmitted and the signal being received.

Preferably, the sensor is an ultrasonic sensor.

Preferably, the system is configured to control the sensor to determine a first distance between the sensor at a point vertically below the sensor on the surface of the matter in the container; the system is configured to control the sensor to determine a second distance, the second distance being the distance between the sensor and a point on the perimeter of the surface of the material in the container which is bounded by the container; and the system is configured to determine a change in the volume of matter in the container based on a change in the first distance and a plurality of second distances.

Optionally, the sensor comprises an acoustic prism. Preferably, the acoustic prism is configured to receive a broadband acoustic signal and transmit a plurality of narrowband acoustic signals, wherein the narrowband band signals are transmitted from the acoustic prism in differing angular directions.

Preferably, the processor is configured to generate a broadband signal comprising an identification code for transmission in at least one narrowband signal, wherein the identification code is for associating a reflected narrowband signal comprising the identification code with at least one narrowband signal.

Optionally, the system further comprises: a rotating means, wherein: the rotating means is configured to rotate the sensor around a first axis and around a second axis, wherein the first and second axes are substantially perpendicular, wherein: the processor is configured to: control the rotating means; and determine the surface area of the matter in the container based on a plurality of distances measured by the sensor.

Preferably, the first axis is perpendicular to the surface of matter below the sensor in the container and the first rotation has a predetermined magnitude θ; and the second rotation comprises tilting the sensor until a maximum distance has been found, wherein the maximum distance is the second distance.

Preferably, n first rotations of the sensor are performed and n×θ is substantially 360°.

Preferably, the processor comprises a field programable gate array (FPGA).

Preferably, the processor is configured to determine the surface area of the matter in the container using the first distance and the second distances, and the change in volume of matter in the container is determined by multiplying the calculated surface area by the change in the first distance.

Preferably, when the first distance changes by a first predetermined threshold, the system is configured to calculate an intermediary volume by multiplying the surface area by the change in the first distance; and when the number of intermediary volumes calculated is greater than a second predetermined threshold, the system is configured to determine the change in the volume of matter in the container by adding the intermediary volumes of the number of intermediary volumes together.

Preferably, the system is configured to store a volume value associated with a volume of matter in the container at a first distance, wherein the stored volume value is associated with the magnitude of the first distance; and the system is configured to determine the volume of matter in the container by evaluating if the first distance has a magnitude associated with a stored volume value.

The present application is also directed towards a method for determining a change in volume of matter in a container. The method comprises: providing a sensor for a container determining the surface area of matter in the container; and determining the change in volume of matter in the container based on the surface area and a distance measured by the sensor.

Preferably, the method comprises determining an amount of additive to add to the container based on a determined change in volume.

Preferably, controlling the sensor comprises transmitting a signal and receiving a reflection of the signal, wherein the processor is configured to provide a signal Indicative of distance based on the time difference between the signal being transmitted and the reflection being received.

Preferably, the signal is an ultrasonic signal.

Preferably, the method comprises: controlling the sensor to determine a first distance between the sensor at a point vertically below the sensor on the surface of the matter in the container; controlling the sensor to determine a second distance, the second distance being the distance between the sensor and a point on the perimeter of the surface of the matter bounded by the container; and determining a change in the volume of matter added to the container based on a change in the first distance and a plurality of second distances.

Optionally, providing the sensor comprises providing an acoustic prism. Preferably, the acoustic prism to is configured to receive a broadband acoustic signal and transmit a plurality of narrowband acoustic signals, wherein the narrowband band signals are transmitted from the acoustic prism in differing angular directions.

Preferably, the method comprises generating a broadband signal comprising an identification code for transmission in at least one narrowband signal, wherein the identification code is for associating a reflected narrowband signal comprising the identification code with the at least one narrowband signal.

Optionally, the method further comprises: rotating the sensor around a first axis and around a second axis, wherein the first and second axes are substantially perpendicular; and calculating the surface area of matter in the container based on a plurality of distances measured by the sensor.

Preferably, the first axis is perpendicular to the surface of matter below the sensor in the container and the first rotation has a predetermined magnitude θ; and the second rotation comprises tilting the sensor until a maximum distance has been found, wherein the maximum distance is the second distance.

Preferably, n first rotations of the sensor are performed and $n\times\theta$ is substantially 360°.

Preferably, the method further comprises: determining the surface area of matter in the container using the first distance and the second distances, and determining the change in volume of matter in the container by multiplying the calculated surface area by the change in the first distance.

Preferably, the method comprises: determining when the first distance changes by a first predetermined threshold, wherein: when it is determined that the first distance has changed by the first predetermined threshold, an intermediary volume is calculated by multiplying the surface area by the change in the first distance; and determining if the number of intermediary volumes calculated is greater than a second predetermined threshold, wherein: when it is determined that the number of intermediary volumes calculated is greater than the second predetermined threshold, the change in volume of matter in the container is calculated by adding the intermediary volumes together.

The disclosure is also directed towards a computer program comprising instructions which, when executed by a processing means operatively coupled to a sensor, causes the processing means to perform a method as described above.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The present disclosure is directed towards an improved system and method for dosing a volume of matter with an additive which comprises measuring the volume of matter in a container and dosing it according to a volume ratio. The system and method may have a number of applications, for example: dosing fuel with a fuel cleaning additive; dosing concentrated liquids with an additive to decrease its viscosity; food preparation where different food types are added with respect to volume.

The system includes a sensor. Any suitable, such as a laser or radar sensor can conceivably be used. However, an ultrasonic sensor has been found to be particularly suitable. The system further comprises an input keypad, a processing unit, a pump, and a power source. Preferably, the power source is a battery. More preferably, the power source comprises a solar panel operatively coupled to the battery, wherein the solar panel is used to generate electricity and the battery is used to store electricity to provide a constant source of power to the system.

The ultrasonic sensor may be any suitable ultrasound sensor known in the art. Preferably the transmitter and receiver of the ultrasonic sensor are integrated into a single housing. In use, the ultrasonic sensor is placed at the top of a container for storing a volume of matter (i.e. the ultrasonic unit is placed in position where it will be remote from matter stored in the container).

The pump is connected to a container containing an additive. In use, the pump is controlled by the processing unit to pump an amount of the additive into the container to which it is coupled. This amount is calculated by the processing unit as described below in more detail.

Figure 1:
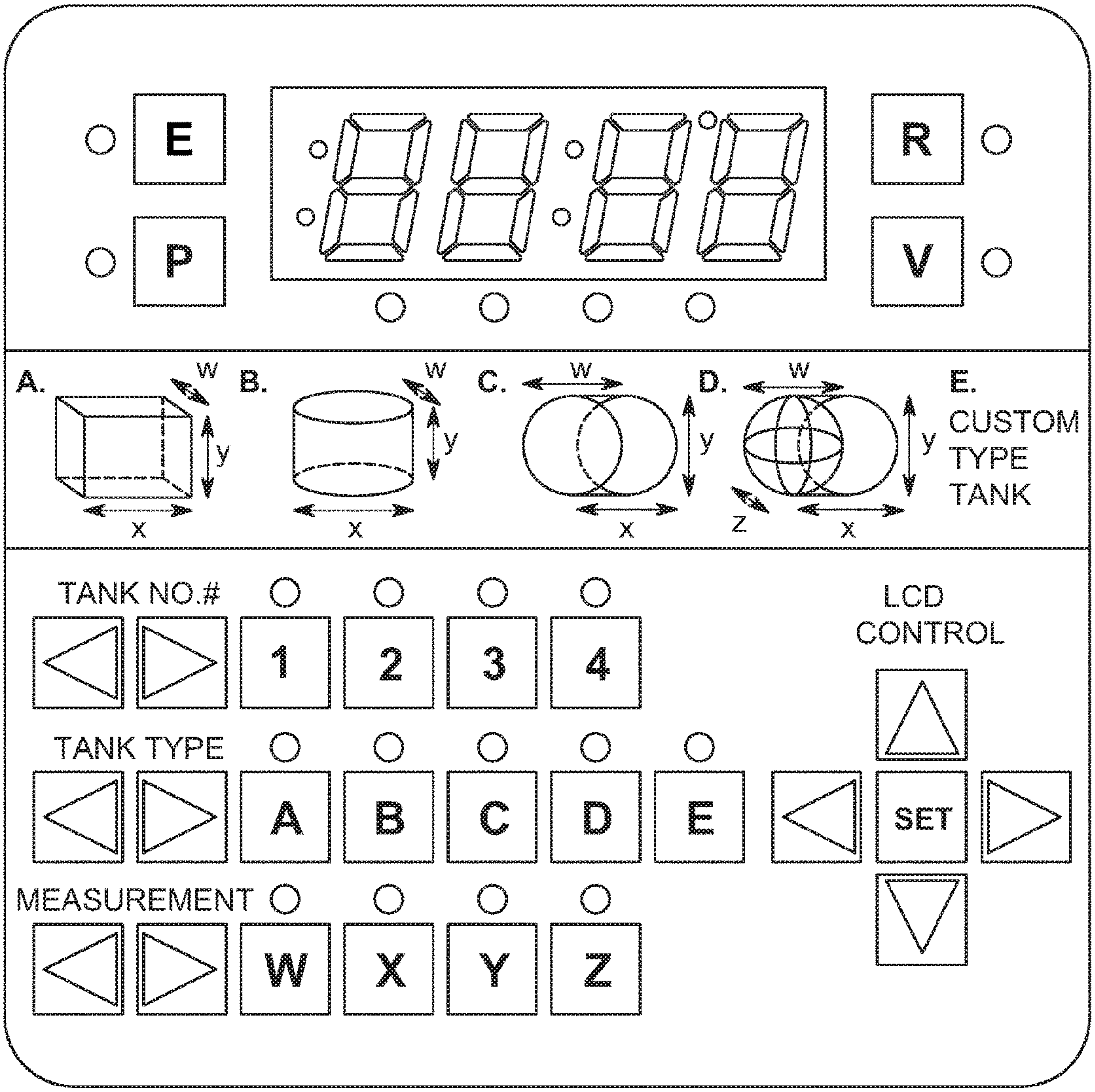
FIG. 1 shows a control panel of a system in accordance with the present disclosure.
Figure 2A:
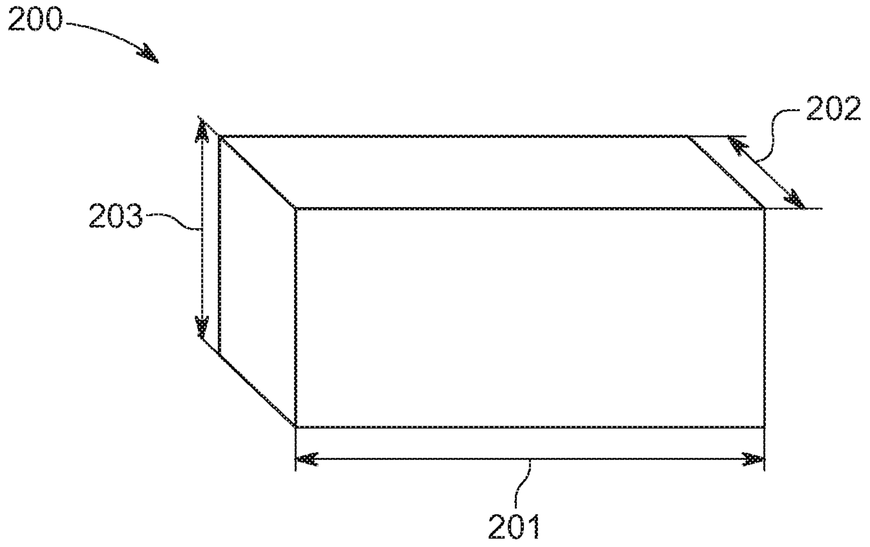
FIG. 2A shows a cuboid container.
Figure 2B:
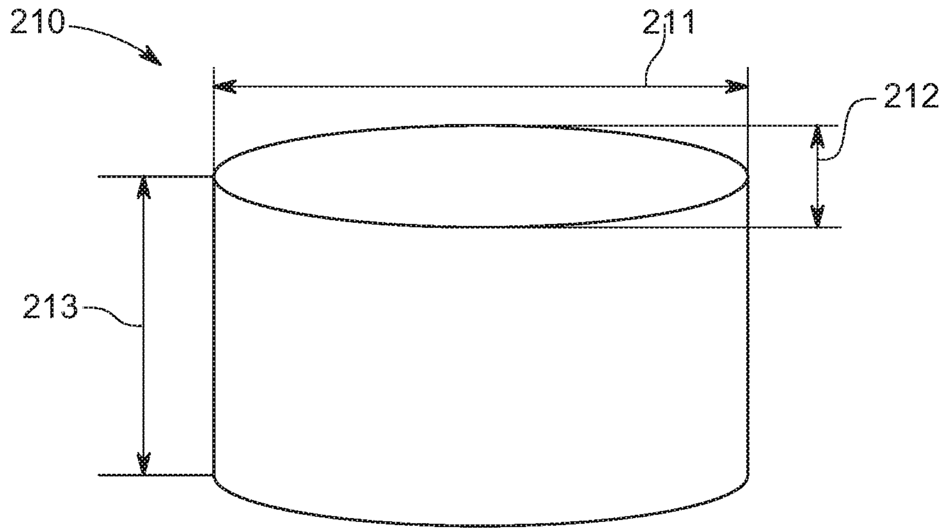
FIG. 2B shows a first type of cylindrical container.
Figure 2C:
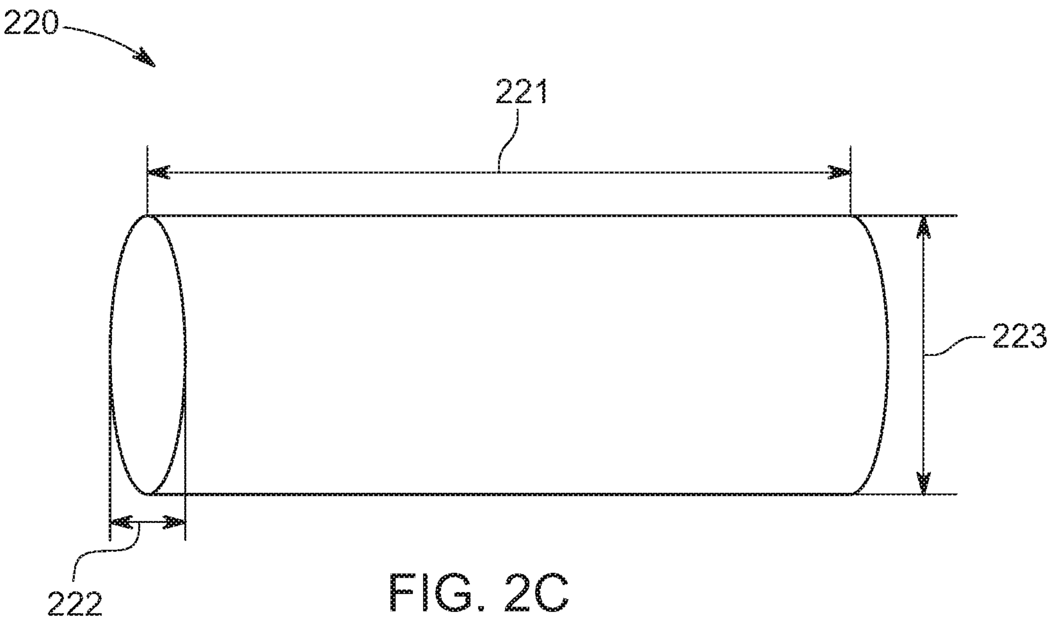
FIG. 2C shows a second type of cylindrical container.
Figure 2D:
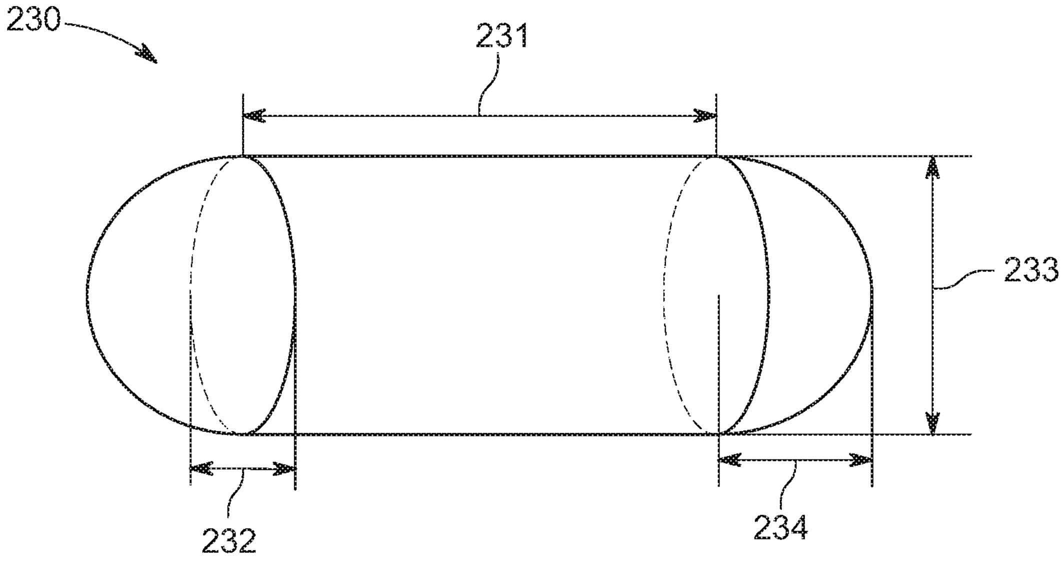
FIG. 2D shows a third type of cylindrical container.

Containers for storing matter come in a number of different shapes and sizes. These containers fall into four main categories. In particular: FIG. 2A shows a cuboid container 200; FIG. 2B shows a vertical cylinder 210 which in use has a circular or oval horizontal cross-section: FIG. 2C shows a first type of horizontal cylinder 220 which in use has a circular or oval vertical cross-section; and FIG. 2D shows a second type of horizontal cylinder 230 having rounded ends which in use has a circular or oval vertical cross-section with rounded ends.

In order to calculate the correct amount of additive required, the volume of matter added to the container needs to be determined.

One technique requires the user to input the type of container (e.g. inputting 1 for cuboid container 200; 2 for vertical cylinder 210; 3 for horizontal cylinder 220; or 4 for horizontal cylinder 230; or 5 for an Arbitrary Sized container). The user puts in container measurements, the desired volume ratio of additive to matter and the viscosity of the additive.

For cuboid container 200, the surface area of matter in the container is given by a=l×w, where a is the surface area, l is length 201, and w is width 202. The volume of the container is therefore given by v=h×a, where v is volume and h is height 203. As the sensor is placed on the top of the container, it detects the distance, d, to the surface of a volume of matter stored in the container. As the cuboid container 200 has a uniform horizontal cross-section which is consistent from top to bottom, changes in volume can be easily calculated based on changes in distance, Δd—i.e. for a batch of matter added to the container, the change in volume of matter in the container is given by Δd×a, where Δd is the change in distance.

For vertical cylinder 210, the surface area of matter in the container is given by $$a = l \times w \times \frac{\pi}{4},$$

where a is surface area, l is length 211, and w is width 212. Thus, the volume of the container is given by v=h×a, where v is volume and h is height 213. As the sensor is placed on the top of the container, it detects the distance, d, to the surface of a volume of matter stored in the container. As matter in the vertical cylinder 210 has a uniform surface area irrespective of height, and a is consistent from top to bottom, changes in volume can be easily calculated based on changes in distance, Δd—i.e. for a batch of matter added to the container, the change in volume of matter in the container is given by Δd×a, where Δd is the change in distance.

For horizontal cylinder 220, the volume of the container is given by $$v = l \times h \times w \times \frac{\pi}{4},$$

where l is length 212, h is height 223, and w is width 222. As the sensor is placed on the top of the container, it detects the distance d to the surface of a volume of matter stored in the container. However, the surface area of the matter in the container will vary depending on how full the container is. As a result, periodical measurement and calculations are used to calculate the volume of matter added to the container. With frequent measurements of d (and hence small changes in d) the volume change of matter in the container can acceptably be approximated to the surface area of the matter in the container multiplied by the change in d.

Figure 3:
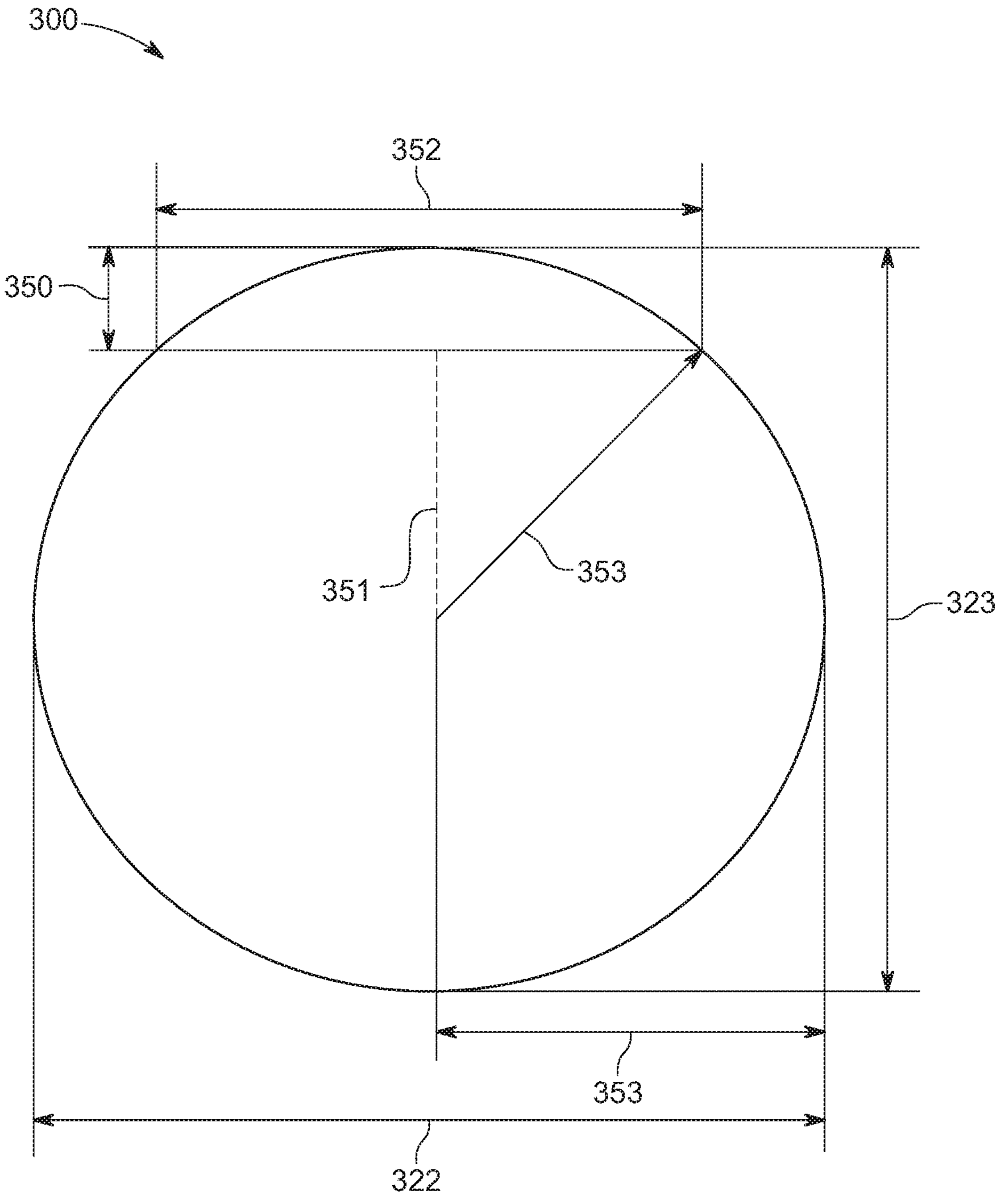
FIG. 3 shows a vertical cross section of the tank shown in FIG. 2C.

FIG. 3 shows a vertical cross section 300 of horizontal cylinder 220. The cylinder has a height h 323 and a width w 322. The surface of the matter is at distance d 350. The distance of the surface of the matter to the centre axis running normal to the cross section is x 351 and the width of the surface of the matter is y 352. Multiplying y by the length of the cylinder gives the surface area of the matter.

The length of y 352 can be calculated based on trigonometry. If w=h then the cross-section is circular. The radius r of the cross-section is $$r^2 = x^2 + \left(\frac{y}{2}\right)^2$$

thus $y = 2\times\sqrt{r^2 - x^2}$. As d+x=h/2 and $$w = h,\ x^2 = \left(\frac{w}{2} - d\right)^2.$$

As the cross-section is circular $$r^2 = \left(\frac{w}{2}\right)^2.$$

Thus $$y = 2\times\sqrt{\left(\frac{w}{2}\right)^2 - \left(\frac{w}{2} - d\right)^2} \text{ or } y = 2\times\sqrt{d^2 - dw}.$$

Similarly, if w≠h then $$y = \frac{2w}{h}\times\sqrt{d^2 - dw}.$$

Thus, it is possible to calculate the surface area of the matter in the container as a function of d once the width, height and length of the container is known.

For horizontal cylinder 220, with rounded ends the volume of the container is given by $$v = l \times h \times w \times \frac{\pi}{4} + \frac{4\pi}{3} \times h \times w \times 2z,$$

where l is length 231, w is width 232, h is height 233, and z is the length of the horizontal radius 234 on the central axis of the container of a half ellipsoid forming the rounded end. Similar to the example above, it is possible to iteratively calculate changes in the volume of matter in the container 230 based on the surface area of the matter, which again will change as a function of d. Thus, it is possible to calculate the surface area of the matter in the container as a function of d once the width, height, length and the horizontal radius of the rounded end of the container is known.

In order to maintain an acceptable level of accuracy, volume changes are measured incrementally. Preferably, volume changes are measured incrementally regardless of the container type. A predetermined increment of d is selected whereby the increment is small enough such that assuming the curve of the cylinder is a straight line is an acceptable approximation of the volume of matter added. Preferably, the predetermined increment of d is 1 mm. If the matter rises by more than the predetermined increment of d, another Incremental calculation is started—i.e. a new value for y is calculated, and the resultant volume is calculated based on a calculation of the surface area of the matter. These increments will continue until d reaches a threshold value. Reaching the threshold causes the processor to determine the volume of the batch of matter that has been added to the container by adding the incremental volumes together. Alternatively, the volume of the batch of matter that has been added to the container can be calculated by maintaining a running total of the incremental volumes. Once this volume reaches or surpasses the set amount, this amount is subtracted from the incremental volume.

Thus, when a batch of matter is added to the container the volume of batch can be easily calculated by the processing unit. The processing unit next determiners how much additive to add based on the volume of the batch and the desired volume ratio of additive to matter. Based on the amount of additive required and the viscosity of the additive, the processing unit determines a length of time during which the pump needs to be run.

However, the viscosity of the additive may change depending on its temperature. Furthermore, in certain circumstances, this change in the viscosity of the additive may alter the volume of additive pumped by the pump in the determined length of time. For example, an increase in temperature may cause the viscosity of the additive to decrease. This decrease in viscosity may result in the volume of additive pumped by the pump in the determined length of time at the higher temperature being greater than the volume of additive pumped by the pump in the determined length of time at a lower temperature.

In order to address this problem, one solution is to provide a temperature sensor proximate to the additive or within the container for the additive. The temperature sensor is used to measure a temperature which is used by the processor to calculate a correction time Δt which is added to the determined length of time to correct for changes in viscosity. Δt can be a positive or negative number. In some applications, it can be assumed that the viscosity of the additive is linearly proportional to temperature. In this case, Δt can be calculated by multiplying the temperature measured by the sensor by a predetermined constant. However, in other applications calculating Δt may include calculating a change in the viscosity of the additive based on the temperature detected by the temperature sensor. The change in the viscosity can be calculated using any suitable method known in the art. For example, the change in the viscosity can be calculated using any one of the Walther formula, the Wright model, the Seeton model, a two-parameter exponential correlation, a three- or four-parameter exponentials, etc.

Alternatively, another sensor can be added to the additive container (i.e. the container which in use houses the additive used for dosing) to monitor the amount of additive stored. This information can also be used to calculate the amount of additive added to the container, obviating the need for the user to enter a viscosity value into the system. Further, when the volume of additive in the additive container drops below a predetermined threshold, an alert can be sent to a user or a service provider using an application or an SMS message that the additive container needs to be refilled. This can facilitate the automation of the ordering process, so that after installation a user can simply forget about the system.

A further alternative is to provide a thermal mass flow sensor, for example an IDT Renesas FS2012. The thermal mass flow sensor can be configured to measure the molar flow rate (the molar flow rate (mol/s) multiplied by the additives molar weight (g/mol) is equal to the mass flow rate (g/s)) of additive to or from the pump. If the pump is a positive displacement pump, a volume of additive pumped at a first time, for a unit of time, will be the same volume as a volume of additive pumped at a second time, for the unit of time. If the mass flow rate value changes, it indicates that the density of the additive changed. As a result, the time required to pump a certain mass of additive will change (i.e. the mass of additive in a given volume is variable). Thus, the thermal mass flow sensor can be used to adjust the length of time that the pump is on for. This value is calculated in the processing unit and thus controls the pump appropriately. Time is proportional to volume and inversely proportional to the molar flow rate.

Preferably, the processor is application specific and may be implemented e.g. on an application-specific integrated circuit (ASIC). More preferably, the processor is implemented using a field-programmable gate array (FPGA). In the examples above, the system can calculate the appropriate dosing of additive required with a stationary sensor.

The disclosure also provides a system for monitoring the volume of matter in a container of unknown arbitrary dimensions. Advantageously, this system is self-calibrating. As a result, it can operate straight away once installed. Furthermore, the system can be easily moved from one container to another depending on usage. To be an economical solution, the system needs to enter the market at a price lower than the extra cost of producing a strapping table. However, in addition to volume measurement, the present disclosure also provides a way to dose the matter based on the change in volume, while managing the temperature and viscosity variances.

For an arbitrary sized container, the system is configured to determine the volume of matter added to a container without the dimensions of the container being known. To this end, a sensor is provided which is configured to be moveable. In particular, one or more motors are provided which are configured to pan (i.e. rotate around a vertical axis) and tilt (i.e. rotate around a horizontal axis) the sensor. Preferably the system is provided with a first motor to tilt the sensor and a second motor to pan the sensor. The sensor is tilted and panned to scan and detect the perimeter of the surface of the matter in a container.

The sensor is rotated from 0 to 360 Degrees. For each rotation of the Pan motor, the tilt motor is rotated a maximum of 180 Degrees in the perpendicular direction. Several readings are taken by the sensor as it rotates. As the sensor moves from the initial stationary position to the perimeter edge, the distance recorded by the sensor increases. Once the sensor goes past the perimeter point, the distance being recorded by the sensor reduces, therefore, making it possible to identify the perimeter of the matter's surface. This point is the longest distance recorded by the sensor.

Figure 4:
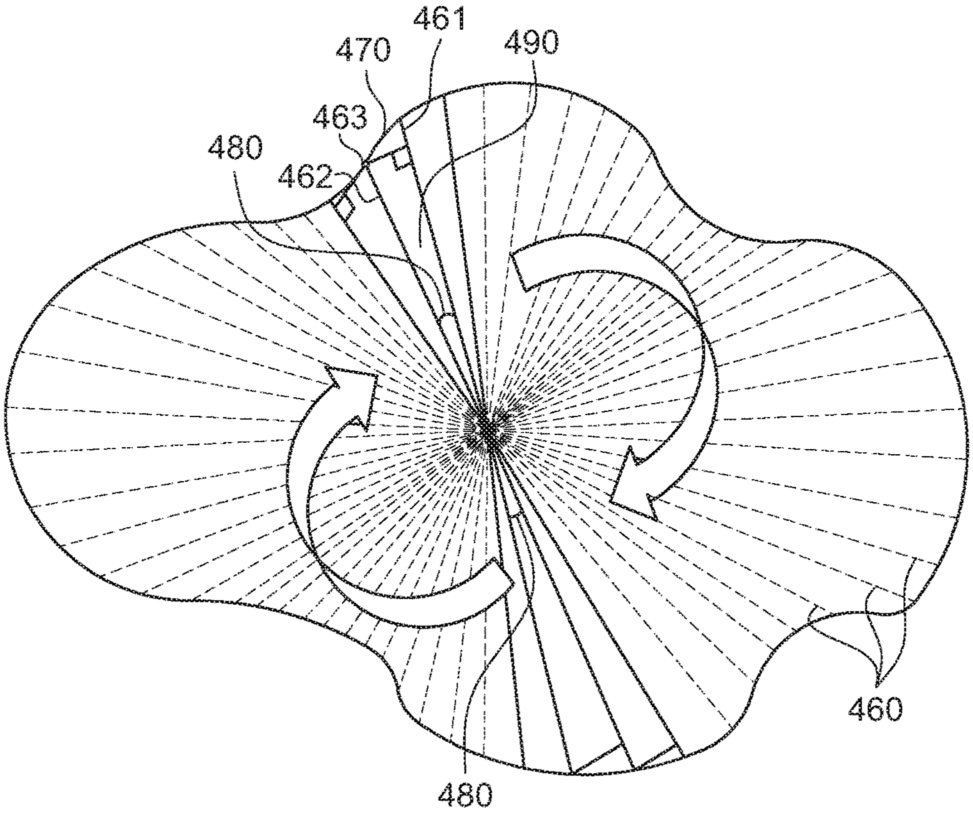
FIG. 4 shows a horizontal cross section of a container of arbitrary dimensions showing the surface of matter stored therein.

FIG. 4 shows the surface of matter in an arbitrarily shaped container. The sensor is located at the top of the container, approximately at the centre of the top of the container. The sensor is oriented to point at the matter below. Tilting the sensor moves the point on the surface of the matter detected by the sensor along one of the dotted lines 460 to the corresponding edges of the container. The dotted line is selected by panning the sensor by a predetermined angle. For example, the sensor can be panned in one iteration from line 461 to select line 462. The sensor is then tilted until point 463 is detected. This point 463 is the point of the line 462 in contact with the perimeter of the surface of the matter. The bounded surface area 490 (i.e. the surface area of the matter bounded by lines 461, 462 and the short perimeter segment 470) can be approximated as the area of a triangle, having an angle θ 480, where θ is less than 1°. Preferably, θ is ⅓rd of 1° or lower. Those skilled in the art will note that the lines shown in FIG. 4 are for the sake of illustration and are not limiting on the scope of the present disclosure. However, it is clear that this technique can be applied to a container of any dimension.

Figure 5:
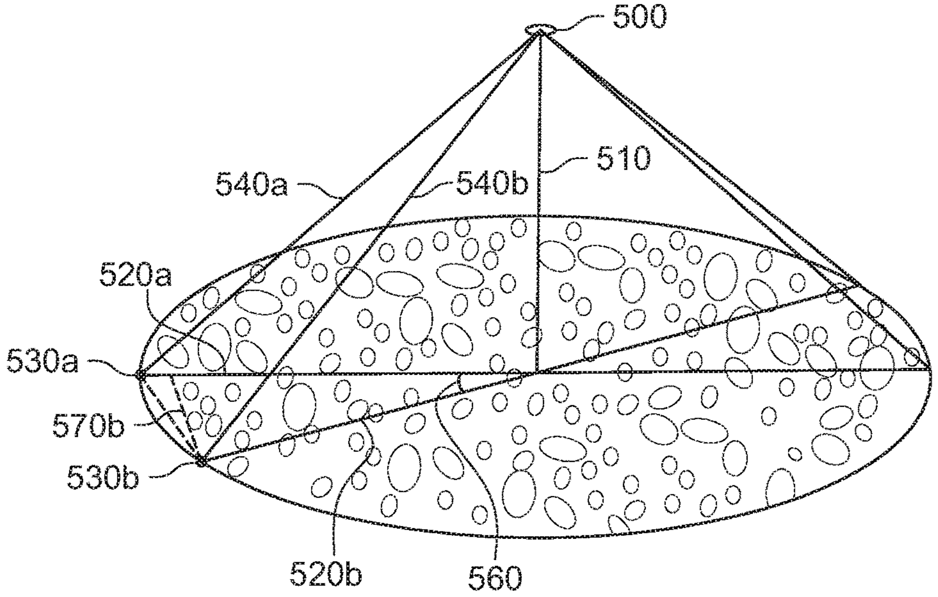
FIG. 5 shows a view of the inside of a container illustrating the position of a sensor relative to the surface of the matter stored in the container.

With reference to FIG. 5, the surface area of a volume of matter can be calculated as follows. The sensor 500 sends a value indicative of the vertical distance d 510 between the sensor and the surface of the matter to the processor. The sensor is then tilted so that the point on the surface of the matter detected by the sensor is moved along line 520*a*. As the point moves away from the centre of the container, the distance detected by the sensor will increase. At point 530*a*, a further tilt of the sensor will cause the distance detected by the sensor to decrease as the sensor will then be pointed to a side wall of the container. The sensor then used to detect the distance 540*a* from the sensor to the perimeter of surface of the matter. The length of line 520*a* can be calculated by the processor based on distance 510 and 540*a* using either a sine function or Pythagoras. The motor is then rotated by a predetermined angle θ 560 and the length of line 520*b* is calculated from length 540*b* in the same way as length 520*a*. This calculation is repeated incrementally until the sensor has been rotated substantially 360°.

Based on the readings received, it is possible to calculate the bounded area 490. For example, the bounded area can be calculated by using the equation $$a = \frac{l_1 l_2 \sin\theta}{2}$$

where a is the bounded area 490, $l_1$ is the length of first line along the surface of the matter (e.g. 520*a*), $l_2$ is the length of the next line along the surface of the matter (e.g. 520*b*), and θ 560 is the angle between the two lines.

Alternatively, a further calculation can be performed. Using the length of the third line $l_3$ 570*b* of a triangle formed by lines 520*a*, 520*b* and angle θ 560 e.g. A sine-function can be used, whereby $l_3=\text{Sine}(\theta)\times l_1$. This calculation assumes that the triangle is a right-angled triangle. The bounded area can then be calculated using $$a = \frac{l_1 \times l_3}{2},$$

where a the bounded area 490.

There will be a slight margin of error through approximating the bounded area 490 as a triangle which will depend on the angle of motor rotation, sensor distance etc. However, the magnitude of these errors can be calculated and compensated for in the final calculation. Furthermore, these errors can be minimised by reducing the magnitude of angle θ 560.

The surface area of the matter is calculated by incrementally rotating n times (where n×θ=360°) and adding the n bounded areas obtained together. If there is no change in d, then the sensor will remain in the zero position. However, if there is a change in d. then this will trigger the recalculation of the surface area. The area is updated upon every iteration by adding the new value and subtracting the oldest value.

To measure the volume of matter added to the container, a predetermined increment of Δd is selected, whereby the increment is small enough such that assuming that Δd×a (i.e. the change in distance to the surface of the matter multiplied by the surface area of the matter) is an acceptable approximation of the volume of matter added. If more matter continues to rise past this increment, the surface area of the matter is again measured as set out above and another incremental volume of matter is calculated. Although this method can be used for any shape of container, it will use more power due to the use of the motors. Thus, over time the processor can store the calculated surface areas along with the corresponding value of d 510 at which they were recorded. Once a surface area has been recorded for each incremental depth Δd, volumes can easily be calculated by looking up the surface area associated with a given depth and multiplying it by Δd. As such, movement of the sensor is no longer required.

While it is preferable that the container be emptied prior to calculating the volume of matter added, to ensure that the correct concentration of additive is present in the matter in the container, it is not necessary. Even if the container is full, the system will ensure over time that the correct concentration of additive is present in the matter in the container as the ration of additive to matter will tend to the correct ratio as the matter replenishing the container is continually correctly dosed with the additive.

Further, as multiple readings are taken, internal supports or structural struts within the container can be detected and ignored when calculating the surface area of matter in a container.

Furthermore, the processor can be configured to determine whether or not the container has one of the known shapes described above with reference to FIGS. 2A-2D. In this case, instead of storing a plurality of surface areas, the processor can be configured to store the dimensions of the container required to calculate the volume of matter in the container.

Instead of providing a moveable sensor, an acoustic dispersive prism can be used. An acoustic dispersive prism is an acoustic device configured to split a broadband acoustic wave into its constituent Fourier components. As used in this disclosure, the term acoustic includes audible and ultrasonic frequencies. For example, an acoustic leaky wave antenna (LWA) can be operated as an acoustic dispersive prism. An acoustic LWA is an acoustic waveguide that allows sound waves to "leak" out into a surrounding media in a controlled manner. In this disclosure, "leaking" refers to the ability of a sound wave in one medium that is traveling parallel to the boundary with a second medium to lose some energy to an acoustic wave radiating into the second medium.

A basic acoustic LWA can be fabricated by suitably configuring an acoustic metamaterial. An acoustic metamaterial (which is also referred to in the art as a sonic crystal, or phononic crystal) is a material designed to control, direct, and manipulate sound waves or phonons in gases, liquids, and solids (crystal lattices). This is done by adjusting characteristics within the metamaterial, such as the bulk modulus P, density p, and chirality of the metamaterial. Thus, they can be engineered to either transmit, or trap and amplify sound waves at certain frequencies.

By providing a broadband acoustic signal, which is preferably a broadband ultrasonic signal, to the acoustic dispersive prism a plurality of narrowband acoustic signal can be produced simultaneously. Each narrowband acoustic signal is a Fourier component of the broadband ultrasonic signal and each narrowband acoustic signal is in a frequency band that is different from the frequency band(s) of the other narrowband acoustic signals. The narrowband acoustic signals are simultaneously dispersed in different angular directions by the acoustic prisms.

Further, an audio sensor or the acoustic prism can also be used to receive the reflections of the transmitted narrowband signals. The distance travelled by a narrowband signal can be calculated by comparing using the time of flight of the narrowband signal (i.e. the difference between the time the narrowband signal was transmitted and the time its reflection was received). In particular, the distance can be calculated using the time of flight of the narrowband signal and the wavelength of the narrow band acoustic signal.

However, in practice the reflected narrowband signals will all be received in close temporal proximity to each other and there is the potential for significant temporal overlap of the received reflections of narrowband signals. To put it differently, a broadband signal will be received from which the reflections of the narrowband signals will need to be extracted. Once a reflection has been extracted from the received broadband signal, it can be matched to its corresponding transmitted narrowband signal. The time of flight for this narrowband signal can then be calculated. To simplify extraction and matching of the narrowband signals, an identification code can be included in each narrowband signal. For example, a pseudo-random bit sequence for each narrowband signal can be coded into the broadband signal prior to the broadband signal being provided to the acoustic prism.

Thus, the time difference between the transmission of a narrowband signal and the reception of its reflection, along with the wavelength of the signal, can provide a distance to a surface in the direction in which the acoustic prism directed the narrowband signal.

As discussed above, the surface area can be obtained using the calculated distances. However, as all reading are obtained in all directions in parallel by a stationary device (rather than in series as described above with reference to a rotatable device), there is no need to rotate the optical prism. Instead, the two longest distances recorded from narrowband signal projected along a line running along the surface of the matter will be points on the perimeter of the matter. These distances can be used to calculate the surface area of the matter as described above, except without the need to rotate the acoustic prism. The volume of matter added to the container can be performed as described above.

Furthermore, the processor can be operatively coupled to a wireless transmitter using any suitable known wireless or cellular protocol (e.g. a Wireless Application Protocol (WAP) for a mobile network transmitter or any peer to peer wireless protocol such as e.g. RF, Bluetooth™, 3G, 4G, 5G) whereby information can be sent to an application on a remote device such as a mobile phone. The application can be configured to display all relevant information from the container, e.g. the remaining matter volume, refill timestamps, incremental area values, GPS Tracking, sensor information etc. The Cellular or Internet based remote manager can also be used to interface with the device to enter or amend configuration information, such as container dimensions, ratio, viscosity etc. This can be achieved through a UART, SPI, 12C or other interface between the FPGA and wireless device.

As a result of providing a sensor that can be tilted and rolled, or a sensor that obtains distance measurements in multiple angular directions without rotation, the present disclosure provides a system and method that automatically calibrates itself. Further the device can be used to dose a volume of matter added to a container with the correct amount of additive. As the system can be configured to operate without the need to input container dimensions or volume, it eliminates the main source of human error and ensures that the additive is administered at every refill. It is fully self-contained and does not require connection to an existing vehicle fuel sensor or any other pre-existing sensor to the system. It can calculate the volume added or subtracted from a container for any container shape. Other inventions use a look-up table approach for unknown container types, but this involves examination of the 3D shape in order to get all of the area values for each height increment. The sensor of a system in accordance with the present disclosure can be fitted to almost any container.

Figure 6:
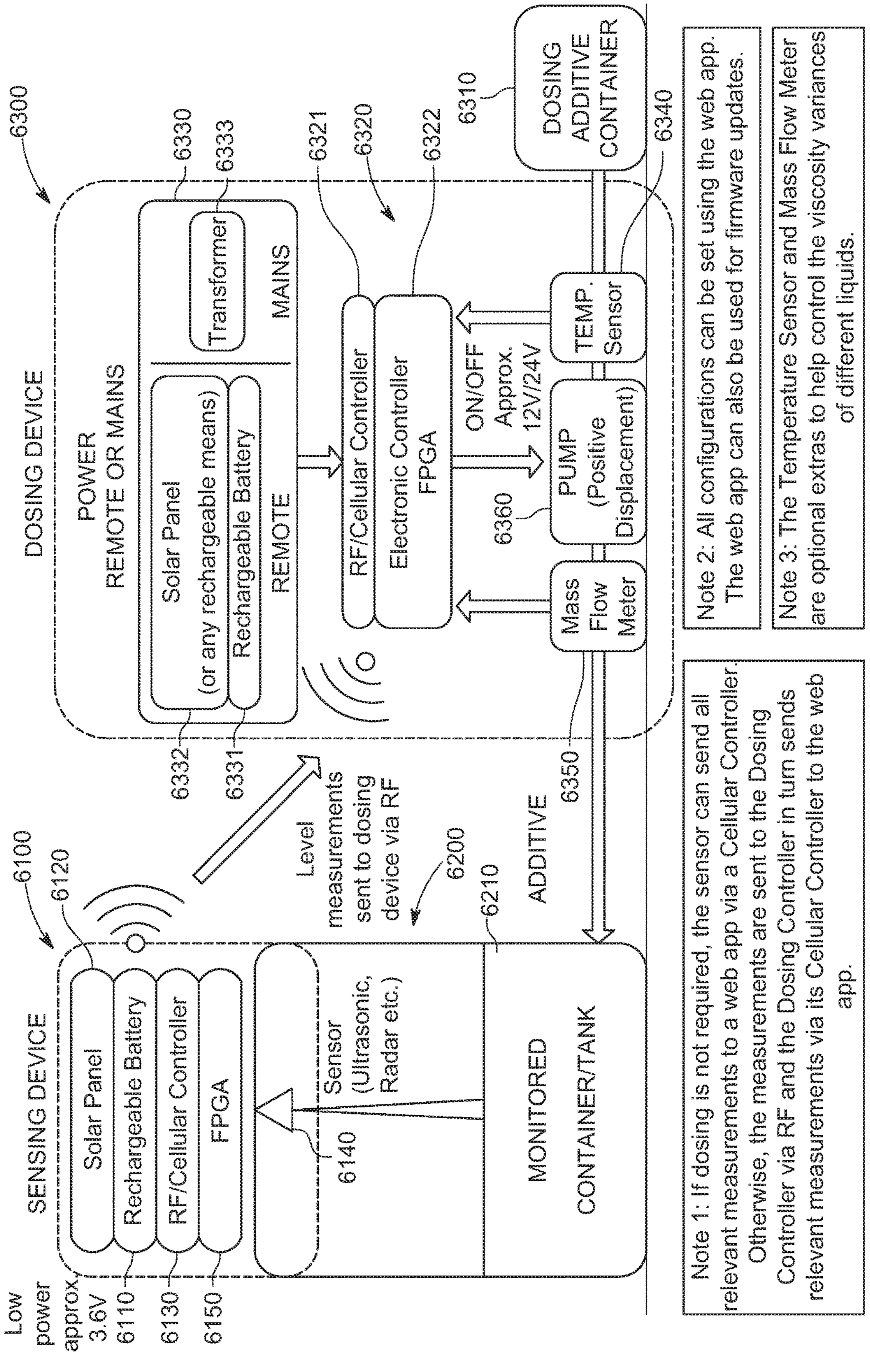
FIG. 6 is a block diagram of a system according to the present disclosure.

FIG. 6 shows a block diagram of a system according to the present disclosure. The system comprises a sensing device 6100 mounted on a container 6200. The sensing device 6100 can be operatively coupled to a dosing device 6300 which is configured to control the delivery of an additive from an additive container 6310 to the container 6200.

The sensor 6100 is provided with a power source. The power source preferably comprises a rechargeable battery 6110. The rechargeable battery can be coupled to a solar panel 6120 which can be used to charge the rechargeable battery 6110. The sensing device also preferably comprises a first communication module 6130. The first communication module 6130 can be RF transceiver or a cellular module. The first communication module 6130 is used to communicate with a control module 6320. The control module 6320 can be located in the dosing device or remotely. The control module 6320 has a second communication module 6321 for receiving communications operatively coupled to a controller 6322.

The sensing device 6100 comprises a sensor 6140 which is mounted to sense the interior of the container 6200. As the sensor can be mounted at the top of the container (i.e. remote from matter 6210 stored in the container 6200), the container does not need to be emptied of matter to mount the sensor.

The sensor 6140 is controlled by a sensor controller 6150. The sensor controller 6140 can be any suitable processor. Preferably, the sensor controller is an FPGA. The readings obtained by the sensor can be processed by the sensor controller 6150 to provide level measurements as described above. The level measurements can be provided to the control module 6320.

The dosing device can be provided with a power source 6330. The power source preferably comprises a rechargeable battery 6331. The rechargeable battery 6331 can be coupled to a solar panel 6332 which can be used to charge the rechargeable battery 6110. Alternatively, or in addition, the power can be provided from the mains via a suitable transformer 6333.

In addition to being operatively coupled to the sensing device 6100, the control module 6320 may also be coupled to a compensation module. The compensation module is configured to detect changes in the flow of additive and to compensate for them. For example, a temperature sensor 6340 can provide temperature readings indicative of the temperature of the additive. This in turn can be indicative of the viscosity of the additive and thus how fast it flows when pumped. As a further example, the mass flow meter 6350 can provide readings indicative of the mass of additive being pumped.

The control module 6320 is configured to control a pump 6360. Preferably the pump is a positive displacement pump. The control module preferably determines how much additive is required based on the readings from the sensing device 6100. The control module then operates the pump for a period of time to provide the amount of additive required. Preferably, the period of time is adjusted based on the compensation module so that the correct mass of additive is provided to the container 6210. The control module can comprise a suitable processor. Preferably, the control module comprises an FPGA.

Those skilled in the art will note that many alterations to this dosing device are possible without departing from the scope of this disclosure. For example, the sensing device 6100 does not need to be coupled to the dosing device 6300. Instead, when dosing is not required, the sensing device can be operatively coupled to an application on a remote device. The application can be a cloud-based application or an application running on a user device, such as a computer, smart phone, or other portable computing device.

On the other hand, if the sensing device 6100 is coupled to the dosing device 6300, the readings from the sensing device can be sent to an application on a remote device by the dosing device, along with readings from the compensation module and the pump. The application can be a cloud-based application or an application running on a user device, such as a computer, smart phone, or other portable computing device. Alternatively, the sensing device 6100 and the dosing device 6300 can both send readings to the application independently of each other.

Further an application can be used to configure the sensing device or the dosing device (or both devices). The application can be a cloud-based application or an application running on a user device, such as a computer, smart phone, or other portable computing device. The application can also be used to provide system updates to one or more devices.

Figure 7:
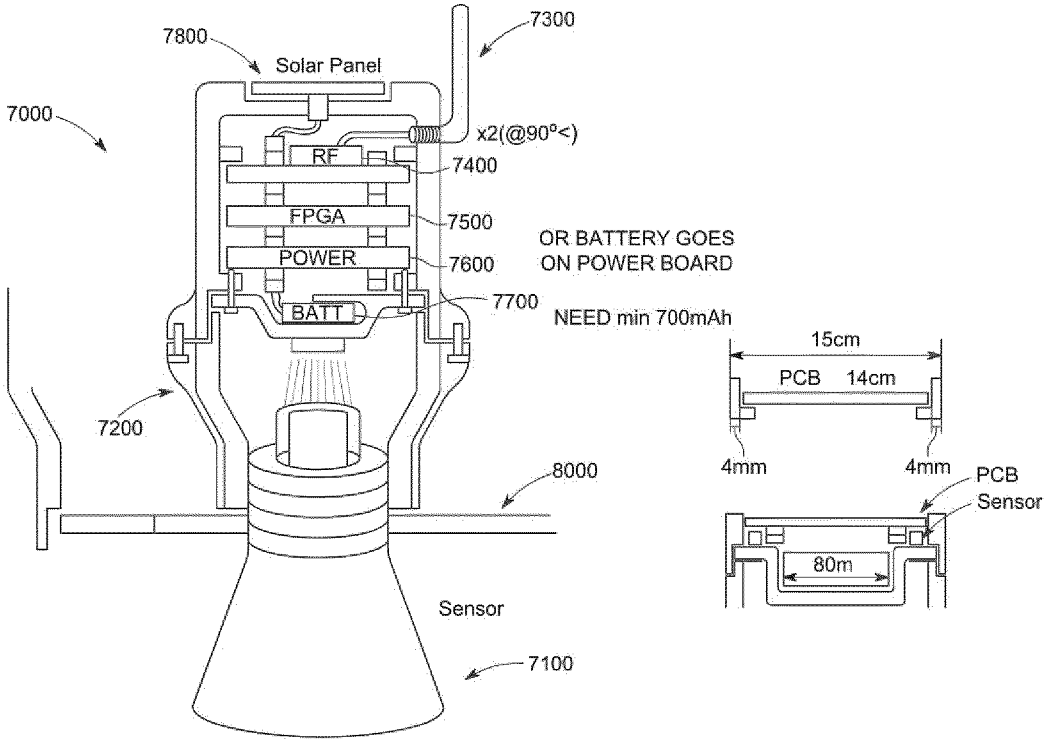
FIG. 7 is a side profile view of a sensing device according to the present disclosure.

FIG. 7 shows a side view of a sensing device 7000. The sensing device 7000 is configured to be mounted on the top of a container 8000 (i.e. a portion of the container remote from any matter in the container in use). The sensing unit comprises a sensing portion 7100 and a control portion 7200. The sensing unit is housed in a housing 7210. An antenna 7300 can be mounted on the housing 7200 and connected to an RF module 7400. A solar panel 7800 can be mounted on the housing and connected to a rechargeable battery 7700. A control module 7500 can be mounted in the housing and configured to control a sensor in the sensing portion 7100. In use, the sensing portion is located within the container. In particular, a hole can be bored in the container. The hole can be tapped to produce a thread, and the sensing device can be screwed into the hole. As shown in FIG. 7, to produce a compact device, components within the housing unit can be stacked over each other.

As such, the system disclosed herein can be installed on any existing container and immediately work without undue calibration. For known container types, the sensor will remain in the stationary position. The pan and tilt motors, or the acoustic prism, can be used to verify the measurement input at setup, and at certain intervals, to ensure measurements have been input correctly. Otherwise, the movable sensor can be held stationary.

The examples discussed above have been provided for the sake of illustration and are not intended to limit the scope of the present disclosure. Whilst the system and method have been developed for dosing fuel in a fuel container with a fuel additive, it is envisaged that the system may be used for many other applications where an accurate volume of an additive needs to be added to a volume of matter.

Furthermore, those skilled in the art will note that many alterations can be made to the above examples without departing from the scope of the present disclosure. For example, although the above system has been described primarily with reference to fuel and fuel additives, the automatic measurement and dosing system described herein can be used in any industry requiring a dosing system for adding an additive to a volume of matter in a predetermined ratio. This includes: dosing drinks with mixers; fuel with a fuel additive; a legionnaires treatment for servicing a cooling tower; fluoride in water; adding tint to paint; perfume mixing; molten metal for alloys; medicine into saline solution; disinfectant to bilge water volume on boats; and, where water is the additive, diluting the concentration of a volume of matter, to name but a few.

The invention claimed is:

1. A system for determining a change in volume of matter in a container of unknown dimensions having a volume of matter therein, the system comprising:

a sensor shaped and configured for placement above the container, the sensor further configured to (a) measure a first distance between the sensor and a point on a surface of the matter directly below the sensor;

(b) measure a second distance, the second distance being a distance between the sensor and a perimeter of the surface of the matter in the container; and (c) incrementally measure a plurality of second distances; and a processor configured to calculate a change in the volume of matter within the container of unknown dimensions, the calculating comprising:

(a) determining a change in the first distance; and (b) calculating a surface area of matter in the container of unknown dimensions based on the plurality of second distances;

wherein the calculating the change in the volume of matter is executed in real-time and without referencing a strapping table; and further wherein the processor is configured to determine an amount of additive to dose in real-time; wherein the determining the amount of additive to dose is executed without referencing a look-up table; and the determining the amount of additive to dose is based on the change in the volume of the matter and at least one of a user defined ratio or percentage.

2. The system of claim 1, wherein:

the sensor is configured to emit a signal and to receive a reflection of the emitted signal; and wherein the processor is configured to provide a signal indicative of distance based on a time difference between the emitted signal and the reflection of the emitted signal.

3. The system of claim 1, wherein the sensor is an ultrasonic sensor, a laser sensor, or a radar sensor.

4. The system of claim 1, wherein:

the calculating the surface area comprises calculating a plurality of bounded areas and summing the plurality of bounded areas.

5. The system of 1, wherein:

the sensor is configured to incrementally rotate and tilt to measure the plurality of second distances.

6. The system of claim 1, wherein:

the sensor is configured to rotate about a first axis in increments of a predetermined angle, the first axis perpendicular to the surface of matter; and at each increment, the sensor is configured to tilt about a second axis until the perimeter has been found.

7. The system of claim 6, wherein:

n rotations of the sensor about the first axis are performed; and $n\times\theta$ is substantially 360°.

8. The system of claim 1, wherein:

the processor comprises a field programable gate array (FPGA).

9. The system of claim 1, wherein:

the change in volume of matter in the container is determined by multiplying the calculated surface area by the change in the first distance.

10. The system of claim 9, wherein:

when the first distance changes by a first predetermined threshold, the system is configured to calculate an intermediary volume by multiplying the surface area by the change in the first distance; and when the number of intermediary volumes calculated is greater than a second predetermined threshold, the system is configured to determine the change in the volume of matter in the container by adding the intermediary volumes of the number of intermediary volumes together.

11. The system of claim 1, wherein the system is configured to:

measure and store a plurality of first distances;

store a plurality of calculated surface areas at each one of the plurality of first distances; and associate each of the plurality of first distances with respective ones of the plurality of calculated surface areas.

12. The system of claim 11, wherein the system is configured to:

prior to the calculating the change in the volume of matter, determine one or more of the plurality of first distances is a stored first distance having an associated stored calculated surface area.

13. The system of claim 1, wherein:

the sensor comprises an acoustic prism.

14. The system of claim 13, wherein:

the acoustic prism is configured to receive a broadband acoustic signal and transmit a plurality of narrowband acoustic signals, wherein the narrowband band signals are transmitted from the acoustic prism in differing angular directions.

15. The system of claim 1, wherein:

the sensor is movable.

16. The system of claim 1, wherein:

the system is self-calibrating.

17. The system of claim 1, wherein:

the change in the volume of matter is negative.

* * * * *